June 1, 1926.

A. P. STIANSEN 1,586,857

CHAIN

Filed August 11, 1925

ANTON P. STIANSEN
INVENTOR by Philip Rich
Attorney.

June 1, 1926.
A. P. STIANSEN
1,586,857
CHAIN
Filed August 11, 1925
2 Sheets-Sheet 2
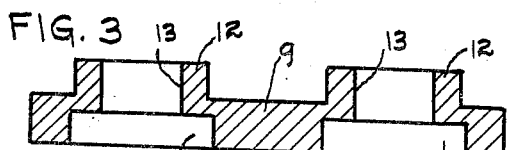
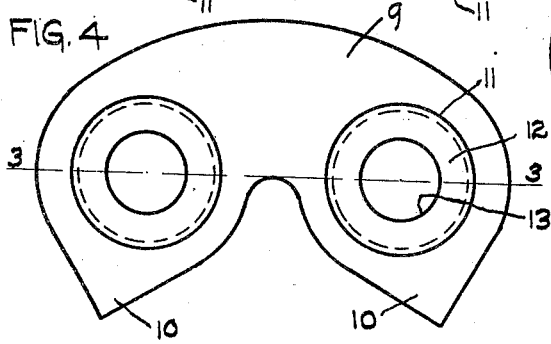
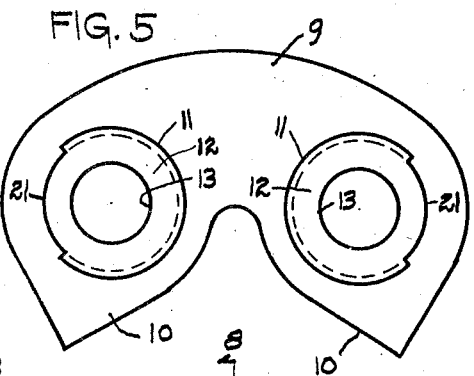
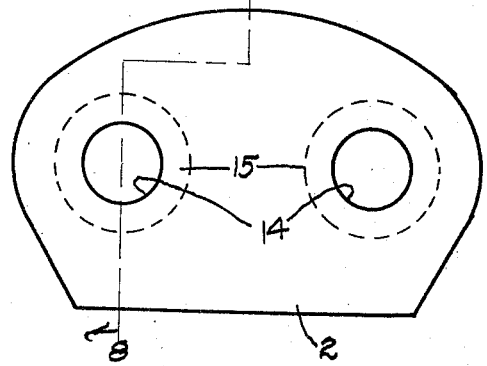
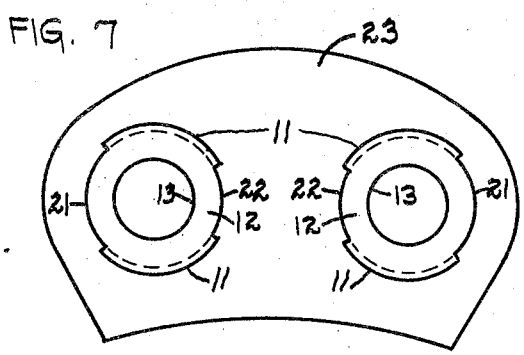
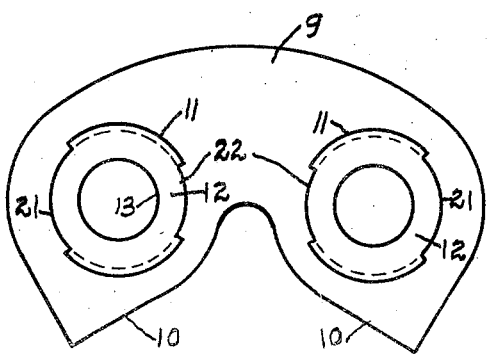
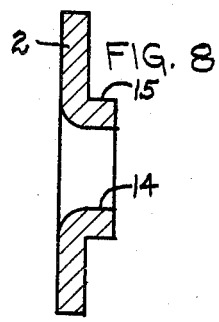
ANTON P. STIANSEN
INVENTOR
by Philip C. Heck
Attorney.

Patented June 1, 1926.

1,586,857

UNITED STATES PATENT OFFICE.

ANTON P. STIANSEN, OF BROOKLYN, NEW YORK.

CHAIN.

Application filed August 11, 1925. Serial No. 49,539.

My invention relates particularly to driving chains of the type usually called silent chains comprising multiple strands and having angular teeth to coact with the teeth of a gear or sprocket with which the chain is operatively connected.

The objects of my invention are, among other things, to provide a novel form of chain of this character whereby the respective bearing surfaces of the adjacent chain links on the transverse tie-pins are better proportioned and more effective in operation; also to provide a chain that may be readily assembled and taken apart; also to form the individual chain links which are usually stamped or punched out of web metal with laterally projecting bearing surfaces of increased strength and durability whereby the drive chain itself will possess great strength in proportion to its width and weight.

Further objects and advantages will be hereinafter described and particularly pointed out in the appended claims.

The drawings show a preferred embodiment of my invention in which—

Fig. 3 is a sectional view of one of the links of which the chain is composed taken on the line 3—3 of Fig. 4;

Fig. 4 is a side view of such chain link;

Fig. 5 is a side view of a modified form of chain link;

Fig. 6 is a side view of one of the side-guide plates;

Fig. 7 is a side view of a center guide plate;

Fig. 8 is a section taken on the line 8—8 of Fig. 6; and

Fig. 9 is a side view of another modified form of chain link that may be used to form the completed chain.

Similar numerals refer to similar parts throughout the several figures.

Figure 1:
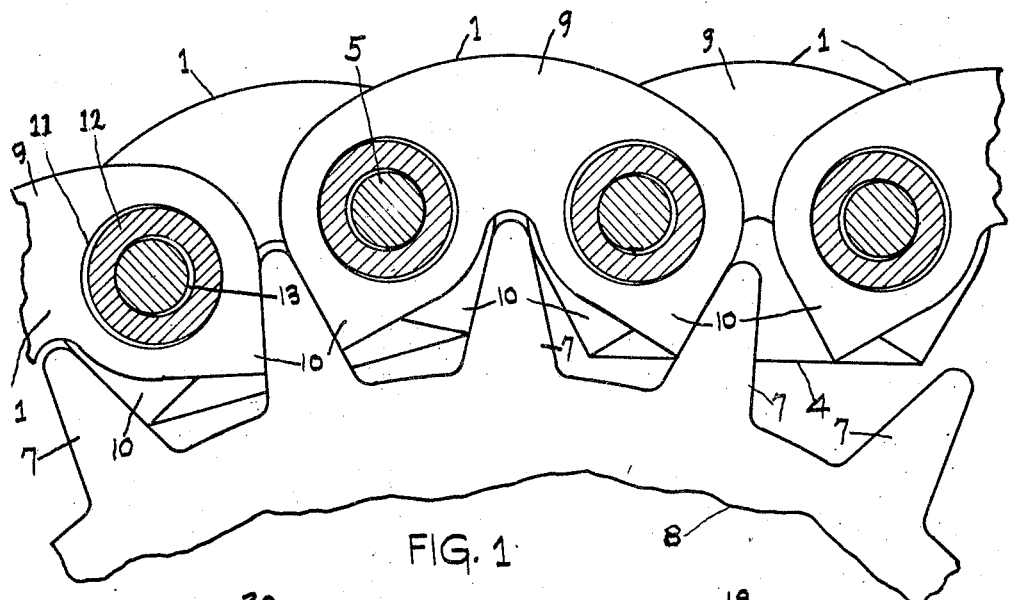
Fig. 1 is a side view of a part of a gear or sprocket wheel having a portion of my improved drive chain mounted thereon, the part shown in section being taken on the line A—A in Fig. 2.
Figure 2:
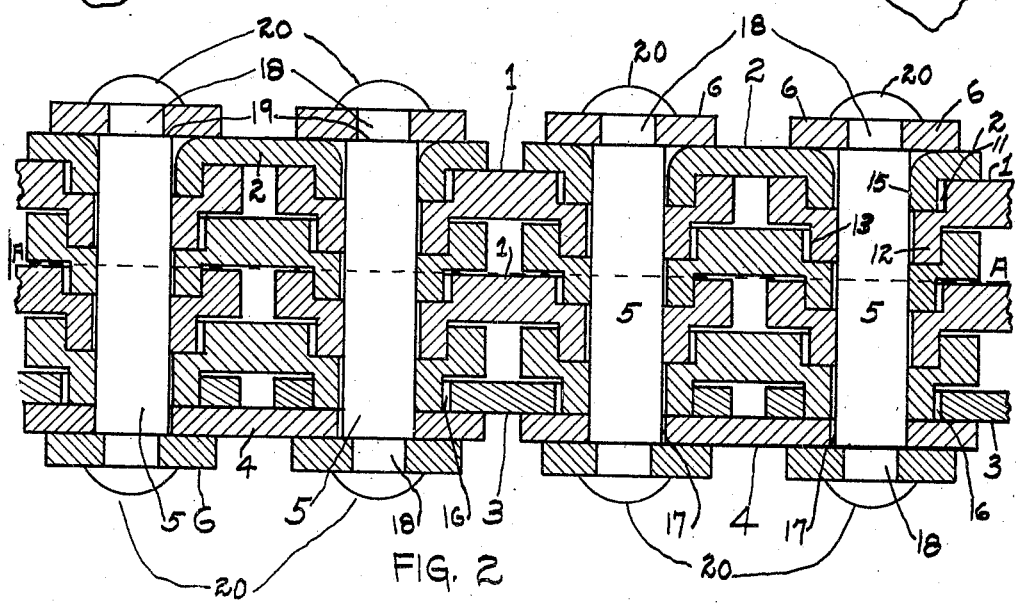
Fig. 2 is a horizontal sectional view of a part of the drive chain extended.

Referring more particularly to Figs. 1 and 2, the chain proper is composed of a series of links 1 formed of flat plates, the side-guide plates 2, the flat links 3, the side plates 4, tie-pins 5, and pin washers 6 bearing on the side-guide plates 2 and side plates 4, all as shown in Fig. 2, to coact with the teeth 7 of the gear or sprocket 8 that may be used with my improved drive chain.

The chain-link 1 is stamped or punched from the web metal and comprises a flat plate having the body portion 9 with the opposite ends formed with angular teeth 10 on which the gear teeth 7 operate as shown in Fig. 1. Each of the opposite ends of the link 1 has formed therein the annular cavity 11 with the concentric annular protrusion 12 and pin hole 13 constituting the bearings for the tie-pins 5 on which the chain link 1 pivots as shown in Figs. 1 and 2.

The side-guide plate 2 (Fig. 6) is a flat plate comprising a body portion the upper edges and opposite ends of which have substantially the same contour as the chain link 1. Each plate 2 has two apertures 14 formed in the annular projections 15 on which the side-guide plate pivots on the tie-pin 5 as shown in Fig. 2.

The flat link 3 (Fig. 2) is a flat plate having a body portion with the opposite ends provided with enlarged apertures 16 which bear on the outer surface of the protrusions 12 of the adjacent sets of chain links 1 as shown in Fig. 2.

The side plate 4 (Fig. 2) is a flat plate having a body portion between adjacent tie-pins 5 and with apertures 17 formed at either end which bear on the tie-pins 5 as shown.

The tie-pins 5 have reduced ends 18 to carry the spaced-apart washers 6 between the annular shoulders 19 and the rivet heads 20 formed on the ends 18 of the pins 5.

In Fig. 5 I have shown a modified form of chain link which has the same contour of the chain link 1 (Figs. 3 and 4), except that bearing segments 21 of less than 180° are length are formed on opposite sides of the cavities 11 which segments form bearing surfaces having the same diameter as the protrusions 12. In Fig. 9 a further modified form of chain-link 1 is shown which embodies the bearing segments 21 of the Fig. 5 construction and also bearing segments 22 of less arc length than the segments 21, the segments 22 being formed on the inner adjacent sides of the cavities 11. Such bearing segments 21 and 22 form enlarged and effective bearing surfaces which are coincident with the outer bearing surfaces of the protrusions 12 substantially along the tension line of the assembled chain links composing the multiple strand chain of Figs. 1 and 2, the Fig. 9 construction showing effective coincident bearing surfaces for a drive through the chain in either direction.

The center guide plate 23 (Fig. 7) may be used when the sprocket teeth 7 are divided to enable the guide-plate 23 to ride in the usual notch formed between the sprocket teeth 7. Such center guide plate 23 has the general contour of the side-guide plate 2 (Fig. 6) and is provided with the bearing segments 21 and 22 as shown in the modified chain link illustrated in Fig. 9.

The assembly of the chain is shown in Figs. 1 and 2 with the chain links 1 interlocked transversely on the tie-pins 5. The cavities 11 and protrusions are fitted to each other with sufficient play to avoid binding as shown in Figs. 1 and 2, and the tie-pins 5 are passed through the pin holes 13 with the side-guide plates 2 adjacent the outer chain link 1 at one end, while the flat link 3 is adjacent the outer chain link 1 at the opposite end. Bearing against the flat link 3 and the outer flat surface of the protrusion 12 of the adjacent chain link 1 is the side plate 4, while the pin washers 6 pivotally held on the pin ends 18 by the heads 20 bear on the side-guide plates 2 and the side-plates 4 respectively; such washers are spaced from each other by the shoulder 19 to allow free pivotal movements of the various chain links 1, side-guide-plates 2, flat links 3 and side plates when assembled as shown in Fig. 2. The respective bearing surfaces of the pins 5, cavities 11, protrusions 12, pin holes 13, apertures 14 and annular projections 15 so coact with one another when the chain is in tension that exceptionally effective bearings for the component parts of the chain are afforded which are held in their proper alinement when the chain is in motion.

The different forms of chain links and side plates as hereinbefore described are preferably made of steel punched and struck up as shown in the drawings to ensure the requisite strength, though they may be formed in any other desired manner, for example, by die-casting or by drop-forging.

I claim as my invention:

1. In a driving chain, a link having a projecting pivot bearing with a concentric pin hole at one end, a concentric oppositely disposed cavity surrounding said hole having a larger diameter than said pivot bearing and a depth less than the thickness of the link, and a segment bearing of greater radius than that of said pin hole formed in said cavity and coincident with said pivot bearing.

2. In a driving chain, a link having a projecting pivot bearing with a concentric pin hole at one end, a concentric oppositely disposed cavity surrounding said hole having a larger diameter than said pivot bearing and a depth less than the thickness of the link, and a segment bearing of greater radius than that of said pin hole and of less than 180° arc length formed in said cavity and coincident with said pivot bearing.

3. In a driving chain, a link having a projecting pivot bearing in one end, a concentric oppositely disposed cavity, said projecting bearing having a diameter less than said cavity, and a pair of oppositely disposed segment bearings formed in said cavity coincident with pivot bearings, the inner bearing having less arc length than the outer bearing.

4. A chain comprising a series of chain links having laterally projecting pivot bearings and therein concentric pin holes interlocked with concentric oppositely disposed cavities formed in adjacent links of greater diameter than said pivot bearings, segment bearings of greater radius than that of said pin holes formed in said cavities and coincident with said pivot bearings, and means for holding the links together.

5. A chain link having a tooth portion at each end to contact with a toothed wheel or sprocket, an annular pivot bearing and a therein concentric pin hole consisting of a lateral protrusion on one side of the link integrally formed by a lateral indentation on the opposite side, said indentation and pivot bearing being concentric and the pivot bearing of less diameter than the indentation, and a segment bearing of greater radius than that of said pin hole formed in said indentation coincident with the outer surface of said pivot bearing.

6. In a drive chain comprising a series of interlocking chain links, a guide plate having a laterally projecting pivot bearing and an oppositely disposed concentric cavity formed in one end, said bearing having a diameter less than said cavity, and segment bearings of less than 180° arc length formed in said cavity coincident with the outer surface of said bearing.

ANTON P. STIANSEN.